United States Patent
Hiben et al.

(10) Patent No.: US 6,980,838 B2
(45) Date of Patent: Dec. 27, 2005

(54) CONTROL CHANNEL TO ENABLE A LOW POWER MODE IN A WIDEBAND WIRELESS COMMUNICATION SYSTEM

(75) Inventors: Bradley Michael Hiben, Glen Ellyn, IL (US); Kevin G. Doberstein, Elmhurst, IL (US); Donald G. Newberg, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/852,865

(22) Filed: May 10, 2001

(65) Prior Publication Data

US 2002/0169008 A1 Nov. 14, 2002

(51) Int. Cl.[7] .............................. H04B 1/38; H04M 1/00
(52) U.S. Cl. ................... 455/574; 455/343.1; 455/69; 455/573
(58) Field of Search ................... 455/574, 572, 455/573, 343, 517, 522, 67.6, 68, 177.1, 455/69, 343.1, 343.2, 343.4, 67.16, 67.11, 455/466; 375/285, 346, 296, 130, 140; 370/336, 370/347, 348, 349, 350, 465, 468, 342, 335

(56) References Cited

U.S. PATENT DOCUMENTS

| | | | | |
|---|---|---|---|---|
| 5,694,429 A | * | 12/1997 | Sekine et al. | 375/262 |
| 5,838,799 A | * | 11/1998 | Cioffi et al. | 375/260 |
| 5,914,933 A | * | 6/1999 | Cimini et al. | 370/208 |
| 5,930,706 A | * | 7/1999 | Raith | 455/422.1 |
| 5,991,635 A | * | 11/1999 | Dent et al. | 455/517 |
| 5,995,500 A | * | 11/1999 | Ma et al. | 370/337 |
| 6,028,854 A | * | 2/2000 | Raith et al. | 370/347 |
| 6,041,047 A | * | 3/2000 | Diachina et al. | 370/347 |
| 6,084,919 A | * | 7/2000 | Kleider et al. | 375/285 |
| 6,289,228 B1 | * | 9/2001 | Rotstein et al. | 455/574 |
| 6,307,892 B1 | * | 10/2001 | Jones et al. | 375/260 |
| 6,335,922 B1 | | 1/2002 | Tiedemann, Jr. et al. | |
| 6,438,375 B1 | * | 8/2002 | Muller | 455/435.3 |
| 6,452,941 B1 | * | 9/2002 | Bruhn | 370/468 |
| 6,498,936 B1 | * | 12/2002 | Raith | 455/466 |
| 6,510,148 B1 | * | 1/2003 | Honkasalo | 370/342 |
| 6,526,030 B2 | * | 2/2003 | Rezaiifar et al. | 370/335 |
| 6,532,223 B1 | * | 3/2003 | Sakoda et al. | 370/337 |
| 6,539,050 B1 | * | 3/2003 | Lee et al. | 370/342 |
| 6,574,211 B2 | * | 6/2003 | Padovani et al. | 370/347 |

* cited by examiner

Primary Examiner—Nay Maung
Assistant Examiner—John J. Lee
(74) Attorney, Agent, or Firm—Steven R. Santema; Terri S. Hughes; Indira Saladi (57) ABSTRACT

A wireless multi-carrier communication system having designated control sub-channels that enable a receiving device to operate in a low power decoding mode. A sending device may send control or payload information via the control sub-channels. The receiving device operates in a low-power decoding mode to decode the control sub-channels, yielding the control or payload information. If the sending device has payload information directed to the receiving device that can not fit within the control sub-channels, it sends the information to the receiving device in one or more payload sub-channels. The receiving device operates in a second, generally higher power decoding mode to decode the payload sub-channels, yielding the payload information.

22 Claims, 5 Drawing Sheets

—PRIOR ART—

CONTROL CHANNEL TO ENABLE A LOW POWER MODE IN A WIDEBAND WIRELESS COMMUNICATION SYSTEM

FIELD OF THE INVENTION

This invention relates generally to communication systems, and more particularly to wideband wireless communication systems.

BACKGROUND OF THE INVENTION

Communication systems, such as land mobile radio and cellular communications systems, are well known. Such systems typically include a plurality of radio communication units (e.g., vehicle-mounted mobiles or portable radios in a land mobile system and radio/telephones in a cellular system), one or more base stations/repeaters (usually located at a fixed base site) and other equipment used in the processing and monitoring of communications. The base stations are typically connected to other fixed portions of the system (i.e., the infrastructure) via wire connections and communicate with communication units and/or other base stations within the coverage area of their respective sites via wireless link(s).

Generally, the amount of information that may be carried by any communication system is a function of the available bandwidth. In recent years, wireless communication systems having increasingly wide signal bandwidths (called wideband systems) have been developed to transmit increasing amounts of information across wireless link(s). For example, wideband systems have been developed to support communication of streaming voice and video over wireless link(s), enabling communication units to participate in voice calls, video calls, web browsing, video-conferencing and/or internet communications with other communication units or infrastructure devices. Oftentimes, wideband systems use multi-carrier modulation whereby the information is divided into a plurality of sub-channels. Larger bandwidths may be accommodated by increasing the number of sub-channels, to the extent that the bandwidth of the total number of sub-channels does not exceed the available bandwidth.

A problem associated with wireless communication systems, and especially wideband systems, is that the power required for communication units to receive and process a signal is roughly proportional to the bandwidth of that signal. This is a concern because communication units are usually powered by limited power supplies (e.g., batteries) that are challenged, even in narrowband systems, to provide power for an eight-hour work day. As an illustration, in a wideband system using multi-carrier modulation with 24 sub-carriers, a communication unit desiring to process the signal will require approximately 24 times greater processing power than would be required in a narrowband private radio system, such as an APCO 25 trunking system. Hence, battery life will be expended roughly 24 times faster in the wideband system than in the narrowband system.

Thus, there is a need for a system and method for communicating messages in wireless multi-carrier communication systems in a manner that enables reduced power consumption of receiving devices (e.g., wireless communication units). Advantageously, the system and method will not introduce significant delays that would counteract the ability of the communication unit to support voice calls, video calls, web browsing, video-conferencing and/or internet communications. The present invention is directed to addressing these needs.

BRIEF DESCRIPTION OF THE DRAWINGS

The foregoing and other advantages of the invention will become apparent upon reading the following detailed description and upon reference to the drawings in which.

DESCRIPTION OF A PREFERRED EMBODIMENT

The following describes a wireless multi-carrier communication system and method that uses designated control sub-channels to enable receiving devices to operate in a low power decoding mode, thereby reducing power consumption of the receiving devices. The receiving device can receive control messages and some payload messages by decoding the designated control sub-channels in the low power mode. The receiving device can switch to a second, higher-power decoding mode, to decode additional sub-channels when necessary to receive messages that do not fit within the control sub-channels, without experiencing significant delays.

In one embodiment of the present invention, there is provided a method of operating a receiving device in a first and second decoding mode. The receiving device receives a transmitted signal comprising a plurality of sub-channels and operates in a first, low-power decoding mode to decode one or more control sub-channels of the plurality of sub-channels, yielding control information. If the control information includes indicia of payload directed to the receiving device, the receiving device can operate in a second, generally higher-power decoding mode to decode one or more payload sub-channels of the plurality of sub-channels, yielding payload information.

In another embodiment of the present invention, there is provided a method of communicating information between a sending and receiving device over a wireless channel. The method comprises sending control or payload information, from the sending device to the receiving device, in one or more control sub-channels of an M sub-channel signal occupying a bandwidth $B_M$. The receiving device may decode the control sub-channels in a low-power decoding mode to receive the control or payload information. If the sending device has payload information directed to the receiving device that can not fit within the control sub-channels, it sends the information to the receiving device in one or more payload sub-channels of the M sub-channel signal. The receiving device decodes the payload sub-channels or, optionally, the full bandwidth $B_M$ in a second, generally higher-power decoding mode to receive the payload information.

In still another embodiment of the present invention, there is provided a communication device operable in a first and second decoding mode. The communication device includes an antenna for receiving a transmitted signal comprising M sub-channels and a decoding element for independently decoding each of the M sub-channels. The decoding element is operable in a first decoding mode to decode one or more control sub-channels of the M sub-channels and in a second decoding mode to decode one or more payload sub-channels of the M sub-channels. Advantageously, the first decoding mode comprises a low-power decoding mode in which the communication unit uses less processing power than would be required to decode the full M sub-channel signal.

Figure 1:
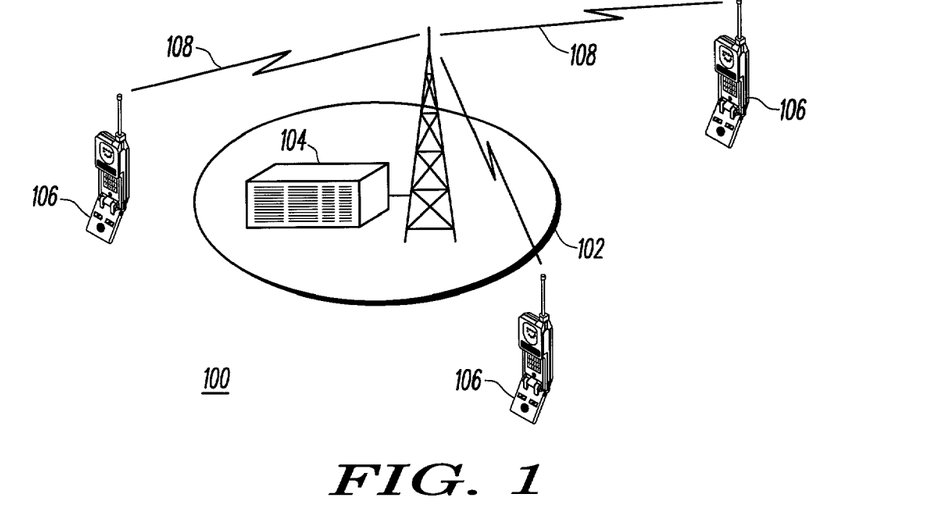
FIG. 1 shows a wireless communication system according to the present invention.

Turning now to the drawings and referring initially to FIG. 1, there is shown a communication system 100 including a base site 102 with a base station 104. The base station 104 communicates with various communication units 106 within the coverage area of the base site 102 over wireless links 108. The wireless links 108 can be shared by multiple communication units 106.

In one embodiment, the wireless links 108 use frequency division duplexing (FDD). In FDD different frequencies are used for communication from the base station 104 to the communication units 106 (called the downlink) and from the communication units 106 to the base station 104 (called the uplink). Multiple communication units 106 may share each of the wireless links 108 using time division multiple access (TDMA). As is well known in the art, in TDMA the wireless links 108 are divided into blocks of time called time slots. The time slots can be assigned to different communication units 106. On the downlink, the base station 104 transmits continuously in each of the TDMA time slots with the time slots destined for the different communication units 106. On the uplink, the communication units 106 take turns transmitting in the different TDMA time slots. Although the communication units 106 share the wireless links 108, the TDMA time slots need not be equally distributed among the communication units 106 and in fact a single radio may be assigned multiple contiguous time slots.

In another embodiment of the present invention, the wireless links 108 use time division duplexing (TDD). In TDD, the same frequencies are used by the communication units 106 and the base station 104 for communication on the uplink and the downlink. The frequencies are divided into blocks of time for use in uplink communication and downlink communication. The blocks of time are further subdivided into time slots so that the wireless links can be shared by the multiple communication units 106 using TDMA in both the uplink and downlink. As with FDD, during the block of time used for uplink communication, the multiple communication units 106 will take turns transmitting in the different TDMA time slots. In the block of time reserved for downlink communications, the base station 104 transmits continuously with the different TDMA time slots destined for different communication units 106.

In one embodiment, the base station 104 forms part of a wideband communication infrastructure such as, for example, that which is described in U.S. patent application Ser. No. 09/760,534, titled "Packet-Based Multimedia Communication System Having One or More Wireless Links," filed Jan. 16, 2001, assigned to Motorola, Inc. and incorporated herein by reference in its entirety. The referenced wideband system supports high-speed throughput of Internet Protocol (IP) packet data, including but not limited to streaming voice and video over wireless link(s) (e.g., the wireless links 108) thereby enabling source and/or destination devices to participate in voice calls, video calls, web browsing, video-conferencing and/or internet communications. The source and/or destination devices may comprise, for example, the communication units 106, the base station 104 or other infrastructure devices (not shown).

In one embodiment, multi-carrier modulation is used for communicating information over the wireless links 108. It is contemplated that virtually any multi-carrier modulation technique may be used, whether presently known or devised in the future. One example is described in U.S. patent application Ser. No. 09/630,235, titled "Scalable Pattern Methodology for Multi-Carrier Communication Systems," assigned to Motorola, Inc. and incorporated herein by reference in its entirety.

Generally, pursuant to multi-carrier systems, a digitized information-bearing signal comprising, for example, control or network management traffic (hereinafter "control information") or voice, data, video, etc. (hereinafter "payload information") is subdivided by a sending device (not shown) into a plurality of bit streams, each of which is encoded into symbols (e.g., 16-QAM, QPSK, or 64-QAM symbols) to form a corresponding plurality of symbol streams. Synchronization and pilot symbols are inserted into each of the plurality of symbol streams, yielding a plurality of composite symbol streams. The composite symbol streams are used to modulate separate carrier signals, yielding a corresponding plurality of sub-channels each occupying a discrete frequency band and carrying a portion of the information in the original information-bearing signal. The plurality of sub-channels are combined into a composite signal that is transmitted over an RF channel from a first location to a second location.

At the second location, a receiver performs generally the inverse operations, demodulating and detecting each sub-channel separately. Pilot interpolation is performed to determine the carrier's phase and to estimate the effects of channel impairments, such as fading, multi-path effects, etc., and errors are corrected to overcome the effect of the channel impairments and reconstruct the original information signal. An example receiver is described in detail in relation to FIG. 5 and 6.

Figure 2:
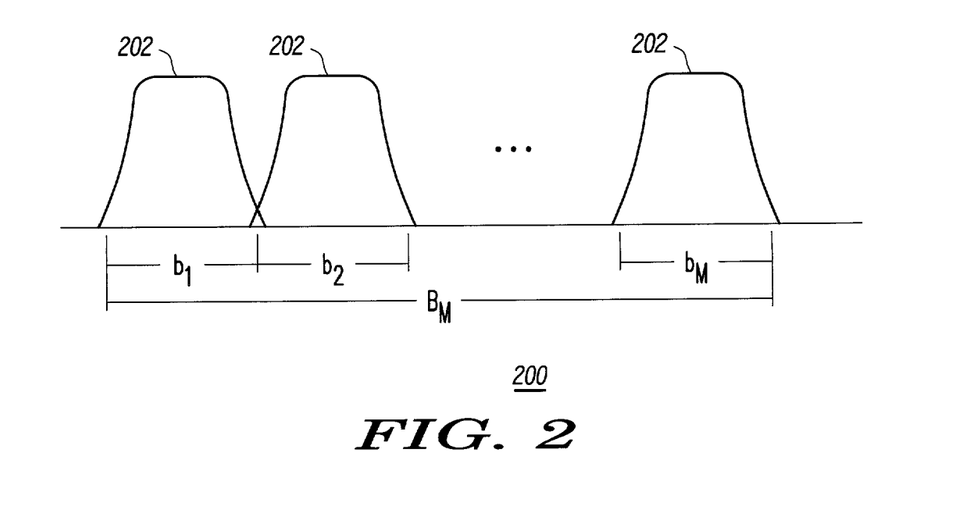
FIG. 2 shows an example frequency spectrum of an M subchannel QAM signal.

FIG. 2 shows an example frequency spectrum of a composite signal S(t) formed by multi-carrier modulation. The signal S(t) is made up of M sub-channels 202, where M comprises an arbitrary number of sub-channels. The sub-channels 202 span respective sub-channel bandwidths $b_1$, $b_2$, ... $b_M$, and the composite signal S(t) spans a bandwidth $B_M$. The bandwidth $B_M$ of the composite signal is somewhat arbitrary but may be dictated by a regulatory authority, such as the Federal Communication Commission ("FCC") in the United States. For example, in the wideband part of the 746–806 MHz band, the FCC recommends a channelization strategy that would permit three channel types: 50 kHz, 100 kHz or 150 kHz. Accordingly, in one embodiment of the present invention, the bandwidth $B_M$ comprises 50 kHz, 100 kHz or 150 kHz, and the number of sub-channels M comprises 8, 16, or 24 respectively, corresponding to those three channel types. In one embodiment, each sub-channel spans a bandwidth of 5.4 kHz. This results in an occupied signal bandwidth of 44 kHz, 87 kHz, and 130 kHz for the 8, 16, and 24 sub-channel embodiments, fitting into the respective 50 kHz, 100 kHz, and 150 kHz channel types. It will be appreciated, however, that the bandwidth $B_M$, the number of sub-channels and/or the sub-channel bandwidths may be tailored to suit different communication system parameters or different regulatory requirements.

Figure 3:
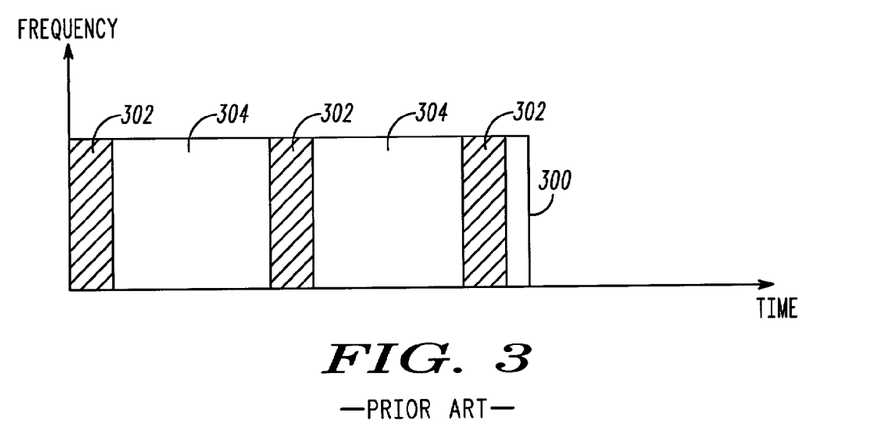
FIG. 3 is a diagram of a time slot that has been divided into control intervals and data intervals according to the prior art.

As has been noted, one of the problems heretofore associated with wireless communication systems is that receiving devices (e.g., communication units 108) can consume large amounts of power to decode and process all of the sub-channels of a multi-carrier signal. Heretofore, efforts to solve this problem cause the receiving device to spend most of the time in a low power sleep mode during which time the communication unit cannot receive payload messages. The communication unit receives payload messages only during brief wake up periods, which causes delays. For example, as best shown in FIG. 3, a downlink time slot 300 according to the prior art is divided into control intervals 302 (i.e., including control information) and data intervals 304 (i.e., including payload information) separated by time. The time slot may comprise a portion of a TDMA time slot destined for a particular communication unit 106 (FIG. 1). This is used, for example, in FLEX paging systems or GSM cellular telephone systems.

In the sleep mode, the communication unit processes only the information in the control intervals 302. This is accomplished by decoding all of the sub-channels of the multi-carrier signal during the period of selected control intervals. The control intervals may or may not include control information of interest to the communication unit. If the control intervals include a "wake up" message, the communication unit begins processing the information in the payload intervals 304 to receive the payload message; otherwise the communication unit does not process the information in the payload intervals 304. Hence, in those instances where a payload message is to be directed to the communication unit, the communication unit must wait at least until the next control interval is concluded and perhaps until a later TDMA time slot associated with the communication unit (typically tens to hundreds of milliseconds), for the communication unit to receive the payload message.

Figure 4:
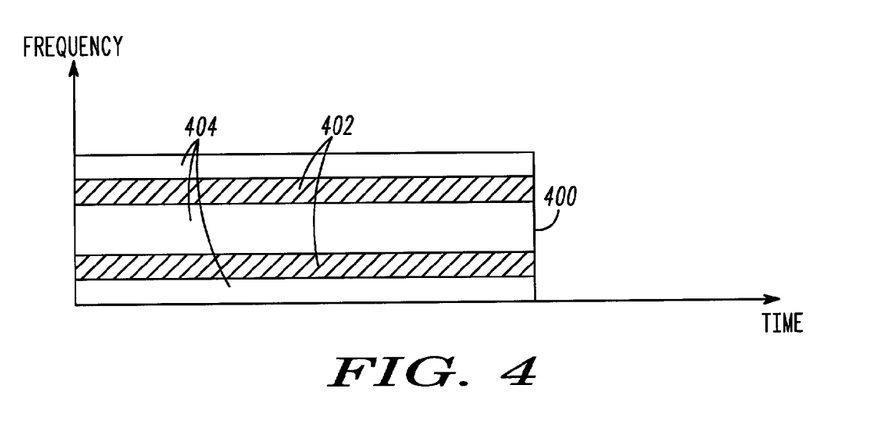
FIG. 4 is a diagram of a time slot that has been divided into control intervals and data intervals according to the present invention.

FIG. 4 shows a time slot 400 according to one embodiment of the present invention. In one embodiment, the time slot comprises a portion of a downlink TDMA time slot destined for a receiving device (e.g., communication unit 106) to enable reduced power consumption of the receiving device. The time slot 400 may also be used on the uplink to enable reduced power consumption of the base station 104 or other uplink receiving device. The time slot 400 is divided into control channels 402 and payload channels 404 separated in frequency. Generally, any number of control channels may be used but most preferably, the number of control channels will be less than all of the sub-channels of the multi-carrier signal so as to occupy only a portion of the available bandwidth. In the illustrated embodiment, the control channels occupy two separate bands within the available bandwidth. This might be implemented, for example, in an eight sub-channel system, by using channels 3 and 6 as control channels and channels 1, 2, 4, 5, 7 and 8 as payload channels.

As will be appreciated, there are hundreds of alternative configurations that may be implemented by simply varying the number and/or position(s) of the control channels and payload channels within the time slot 400. Of course, the configuration of the time slot 400 will also vary according to the number of sub-channels in the multi-carrier signal. The control channels may comprise separate or adjacent band(s) and may be positioned anywhere within the time slot 400.

Optionally, the configuration of the time slot 400 may be dynamically controlled, for example, by the sending device (e.g., base station) or a central controller to provide fewer numbers of control or payload channels during low traffic periods, or greater numbers during high traffic periods, as long as the number of control and payload channels does not exceed the total number of available sub-carriers. In one embodiment, the sending device informs the receiving device of the new time slot configuration by a control message. The sending device allows time for the receiving device to adjust to the new configuration before sending messages using the new configuration.

Still another option might provide for the base station or central controller to select different control and/or payload channels from a time slot 400 having multiple, fixed control and/or payload channels. For example, if channels 3 and 6 are designated control channels, the base station or central controller might use only channel 3 (or 6) and instruct the receiving device to decode only channel 3 (or 6) for a period of time. The sending device informs the receiving device of the selected channel(s) by a control message. The sending device allows time for the receiving device to adjust to the selected channel(s) before sending messages using those channel(s).

The time slot 400 enables reduced power consumption of the receiving device because the receiving device can spend most of the time in a low power decoding mode in which it decodes only the control sub-channels (or sub-channels designated as control channels), not the payload channels. Thus, continuing the present example, a receiving communication unit may decode only channels 3 and 6 (or a designated one of channels 3 and 6) in the low power decoding mode. In this first decoding mode, the communication unit would use only about 25% (i.e., $2\psi 8$, in the former case) or 12.5% (i.e., $1\psi 8$, in the latter case) of the processing power than would be required to decode the full wideband signal. The control sub-channels may include control information or payload information. If the control information includes indicia of payload directed to the communication unit (similar to a "wake-up" message), the receiver switches to a second, generally higher-power decoding mode to decode the payload channels or designated ones of the payload channels. In either case, the receiver may continue to decode the control sub-channels in the second decoding mode.

Advantageously, in those instances where a payload message is to be directed to the communication unit, the communication unit may switch rapidly from the low power decoding mode to the second, higher-power decoding mode with minimal delay. This is possible because the control channels are continuous within the time slot, thus there is no need for the communication unit to wait for a particular time interval or a later TDMA time slot to receive the payload message. If delays can be tolerated, alternative embodiments might also be implemented whereby the control channels or a portion of the control channels are divided into time intervals and a "sleep mode" used (i.e., in a manner analogous to that described in relation to the entire time slot of FIG. 3)) to even further reduce the power consumption of the receiver.

Figure 5:
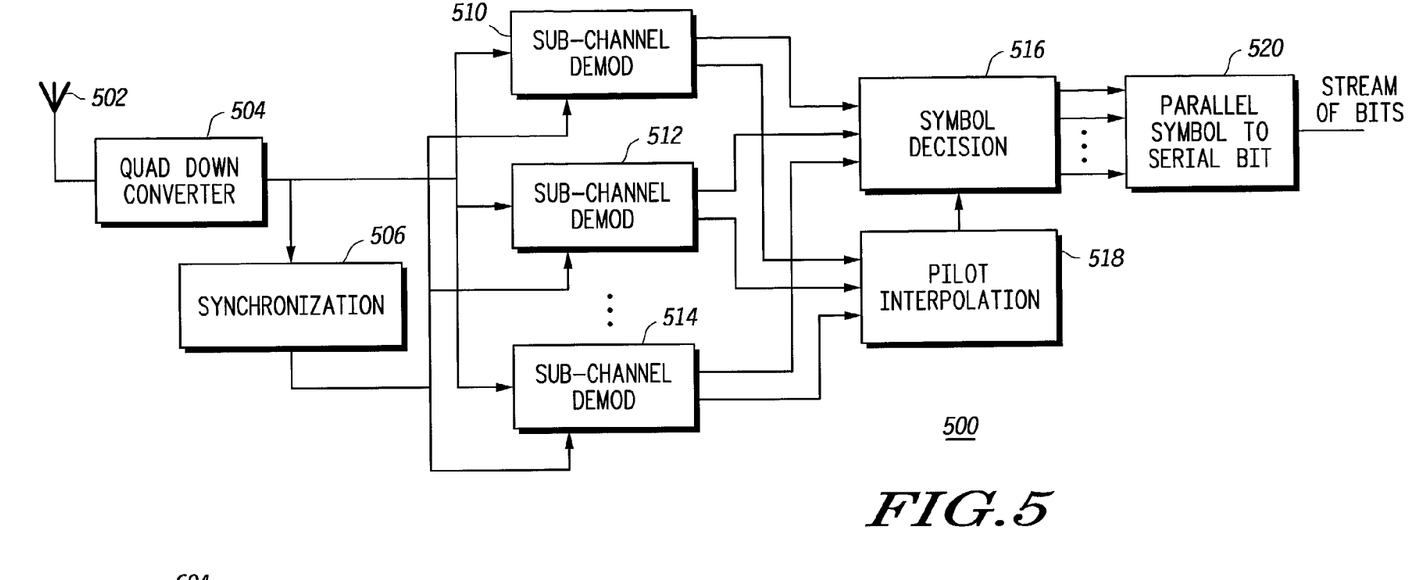
FIG. 5 is a block diagram of a multiple subchannel QAM receiver.

There is shown in FIG. 5 a block diagram of a receiver 500 that may be used to implement the present invention. As will be appreciated, the receiver 500 is shown by way of example rather than limitation. The receiver forms a part of a receiving device, such as a communication unit 106, having a processor, such as a digital signal processor (not shown) and memory. Many if not all of the functions of the receiver 500 may be implemented in software executed by the digital signal processor. The receiver 500 includes an antenna 502 for receiving an M sub-channel signal over a radio frequency (RF) channel that is subject to various channel impairments such as frequency selective, Rayleigh, and Rician fading, the addition of noise, or a Doppler shift. A quadrature downconverter 504 translates the received signal down from the radio frequency so that it is centered substantially at 0 Hz. The downconverted signal is then sent into a synchronization block 506 and various sub-channel demodulator blocks 510, 512, 514.

Depending on the operating mode, the M sub-channel demodulators 510, 512, 514 are adapted to process the M sub-channel signal from the quadrature downconverter 504 and timing information from the synchronization subsystem 506 to output corrupted raw data, pilot, and sync symbols (e.g., 16-QAM, QPSK, 64-QAM, etc.). In one embodiment, for example, in a low power mode, only the sub-channel demodulators corresponding to the control sub-channels (or designated ones of the control sub-channels) are used. Thus, continuing the example used in relation to FIG. 4, in an eight sub-channel system having eight sub-channel demodulators, the third and sixth sub-channel demodulators, or perhaps only one of the third and sixth sub-channel demodulators might be used in the low power mode to conserve battery power. In the second decoding mode, the sub-channel demodulators corresponding to the payload channels (or designated ones of the payload channels) and optionally, the sub-channel demodulators corresponding to the control sub-channels (or designated ones of the control sub-channels) may be used, to process payload and/or control messages.

In either case, the corrupted symbols output from the sub-channel demodulators generally differ from the symbols that were originally sent by the sending device (not shown) because of the effects of the communication channel. The corrupted data symbols are sent from the appropriate sub-channel demodulation blocks 510, 512, 514 to a symbol decision block 516 and the corrupted pilot and sync symbols are sent to a pilot interpolation block 518.

Figure 6:
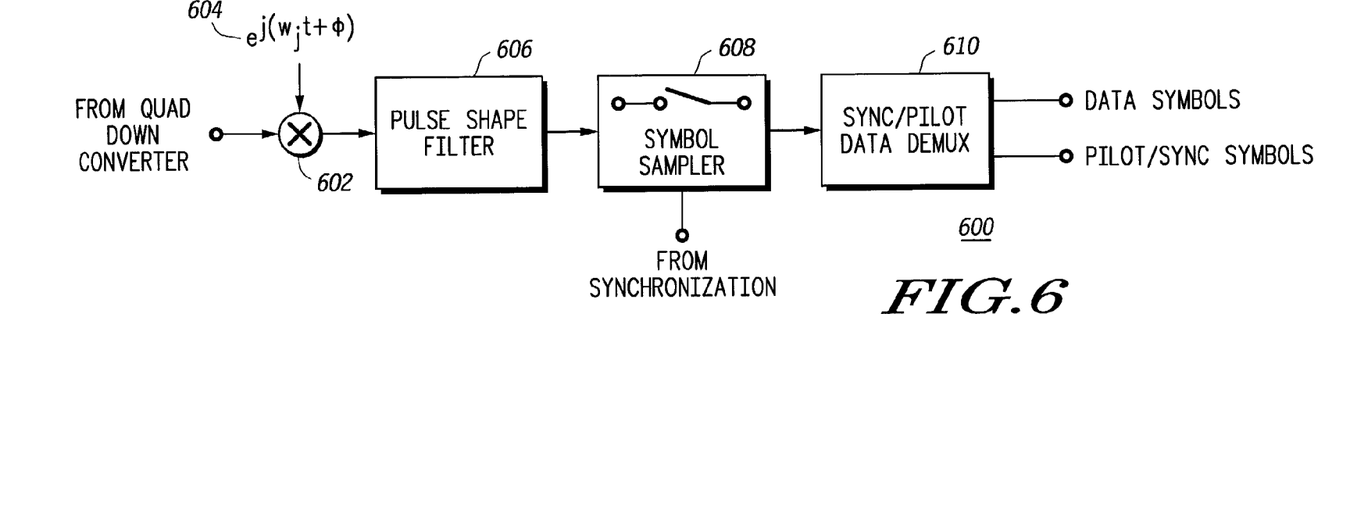
FIG. 6 is a block diagram of a subchannel demodulation block of the multiple subchannel QAM receiver of FIG. 5.

FIG. 6 shows one of the sub-channel demodulation blocks in more detail. The composite signal received from the quadrature downconverter 504 (FIG. 5) is sent into a complex mixer 602 to translate the sub-channel being demodulated from the sub-carrier frequency to substantially 0 Hz. This is done by mixing the received downconverted signal by a sub-carrier signal 604. The signal from the mixer 602 is then sent into a pulse shape filter 606. The pulse shape filter 606 removes all the other sub-channels except for the one centered at 0 Hz from the composite signal. The signal out of the pulse shape filter is sent to a symbol sampler 608 which samples the signal at the center of the pulse shape so that corrupted sync, pilot, or data symbols are obtained. The symbol sampler uses the input from the synchronization block 506 (FIG. 5) to determine when to do this sampling.

The corrupted sync, pilot, and data symbols from the symbol sampler 608 are sent to a sync/pilot data symbol demultiplexer 610. The sync/pilot data symbol demultiplexer splits the stream of corrupted symbols received from the symbol sampler 608 into two streams. The corrupted data symbols are sent to the symbol decision block 516 and the corrupted pilot and sync symbols are sent to the pilot interpolation block 518 (FIG. 5).

The pilot interpolation block 518 receives corrupted pilot and sync symbols from the sync/pilot data symbol demultiplexer 610 from all of the operating M subchannel demodulators 510, 512, 514. It produces estimates of the effects of the communication channel for each of the data symbols. These channel estimates are sent from the pilot interpolation block 518 to the symbol decision block 516 where they are used to determine what symbols the sending device sent. For example, one pilot-based communication channel estimation method that could be used by the pilot interpolation block 518 is detailed in U.S. patent application Ser. No. 07/783,289, titled "Communication Signal Having A Time Domain Pilot Component," assigned to the assignee of the current invention and incorporated herein by reference in its entirety.

The symbol decision block 516 uses the corrupted data symbols from the operating sub-channel demodulators 510, 512, 514 along with channel gain and phase estimates from the pilot interpolation block 518 to determine which symbols were sent by the sending device. One method for doing this is described in the above-referenced U.S. patent application Ser. No. 07/783,289. The symbol decision block 516 outputs symbols (i.e., corresponding to symbol mapping used by the sending device) to a parallel symbol to serial bit converter 520. The parallel symbol to serial bit converter maps the symbols to a serial stream of bits, yielding a recovered information signal which may include, for example, control or payload information.

Figure 7:
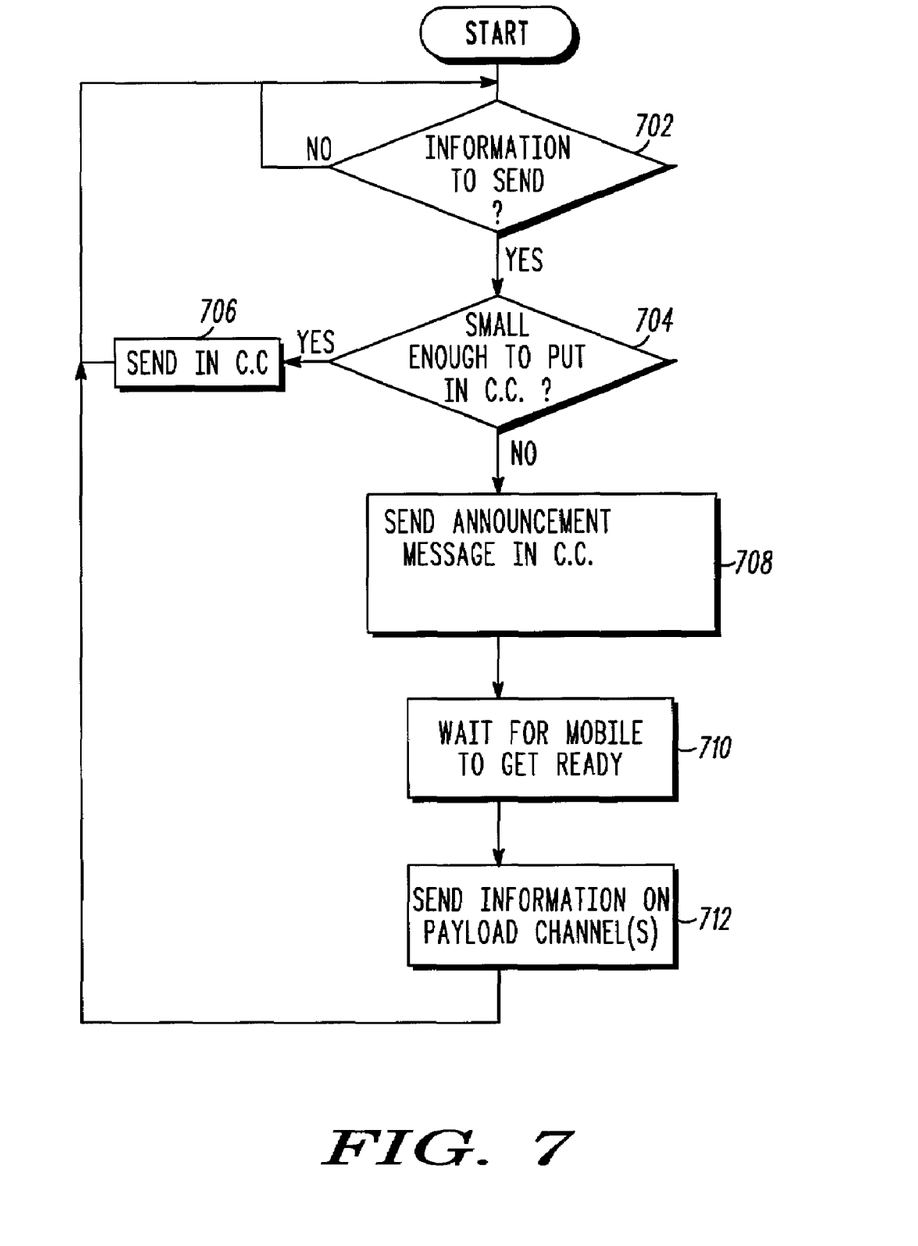
FIG. 7 is a flowchart illustrating steps performed by a sending device in one embodiment of the present invention.

Now turning to FIG. 7, there will be described various steps performed by a sending device in communication with a receiving device according to one embodiment of the present invention. In one embodiment, the sending device comprises a base station 104 and the receiving device comprises a wireless communication unit 106 (FIG. 1). At step 702, the sending device determines whether it has information to send to the receiving device. The information may comprise control or payload information. The information may be generated or forwarded by the sending device. For example, the base station 104 may forward control information generated by a central controller or may forward payload information generated by communication units or infrastructure devices at different sites, to the communication unit 106.

If the sending device has information to send, it determines at step 704 whether the volume of information is small enough to fit within a designated one or more control sub-channel or sub-channels of an M sub-channel RF signal. If so, it proceeds at step 706 to send the information in the designated control sub-channel(s). The sending device may send payload information or control information via the designated control sub-channel(s). Advantageously, the control channels occupy only a portion of the bandwidth $B_M$ of the M sub-channel RF signal, as described in relation to FIG. 4, so that the receiving device may operate in a low power decoding mode to decode only the designated control sub-channel(s).

If the information does not fit within the control sub-channel(s), the sending device sends at step 708 a message ("announcement message") on the control sub-channel(s) informing the receiving device to change to a second decoding mode to decode one or more additional sub-channels. The additional channels may comprise designated payload sub-channels or additional control sub-channels. In one embodiment, payload messages are communicated on designated payload channels and control messages are communicated on designated control sub-channels. As will be appreciated, however, some payload messages may be communicated on designated control channels and some control messages may be communicated on designated payload channels. For convenience, it is assumed in FIG. 7 that the additional channels comprise payload sub-channels, for carrying payload information. In such case, the announcement message may be considered a control message ("control information") that informs the receiving device when payload information is being directed to it.

At step 710, the sending device waits a period of time for the receiving device to transition to the second decoding mode. At step 712, after the receiving device has had enough time to switch to the second decoding mode, the sending device sends the payload information to the receiving device via the designated payload channels. Hence, the payload information may be received by the receiving device in the second decoding mode upon decoding the payload sub-channels. In one embodiment, the receiving device decodes the full channel bandwidth $B_M$ (including both payload and control sub-channels) in the second decoding mode to receive both control and payload information.

Figure 8:
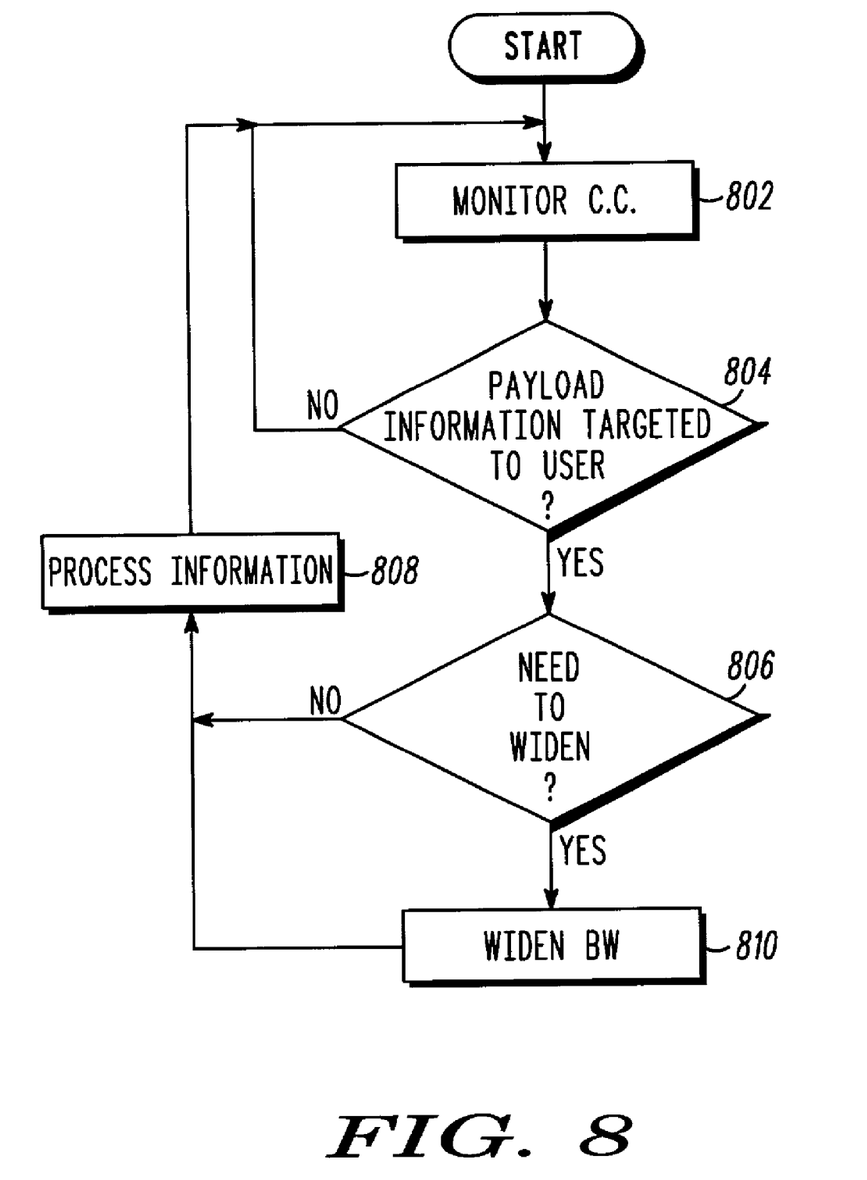
FIG. 8 is a flowchart illustrating steps performed by a receiving device in one embodiment of the present invention.

FIG. 8 shows various steps performed by a receiving device (e.g., communication unit) according to one embodiment of the present invention. The method presumes that the receiving device has received an RF multi-carrier signal comprising a plurality of sub-channels. At step 802, the receiving device monitors (decodes) one or more designated control sub-channels of the received RF signal, yielding control information. In one embodiment, step 802 is accomplished with the receiving device in a first, low-power decoding mode whereby the receiving device decodes only the control sub-channels.

At step 804, the receiving device determines, from the control information, whether it is the target of payload information. In one embodiment, the receiving device is adapted to receive an announcement message ("control information") indicating that the receiving device is the target of payload information. If the receiving device receives such a message, it determines that it is the target of payload information. In the absence of such message, the receiving device continues to monitor the control sub-channels at step 802 until such time as it is the target of payload information.

If the receiving device determines that it is the target of payload information, it determines at step 806 whether it needs to widen or increase the number of sub-channels it is monitoring to receive the payload information. In one embodiment, the announcement message or other control message informs the receiving device whether it needs to widen the number of sub-channels it is monitoring. For example, the announcement message may instruct the receiving device to enter a second, generally higher-power decoding mode to begin decoding additional payload or control sub-channels. The absence of such an instruction or, alternatively, an instruction to remain in the low-power mode will cause the receiving device to determine that it does not need to widen the number of sub-channels it is monitoring to receive the payload information.

If, at step 806, the receiving device determines that it does not need to widen the number of sub-channels it is monitoring, it decodes the designated control sub-channels and processes the received information at step 808 in the first decoding mode. Otherwise, if the receiving device determines at step 806 that it needs to monitor additional channels, it widens its bandwidth (e.g., by enabling additional sub-channel demodulation blocks) at step 810 and processes the received information at step 808 in the second decoding mode. In one embodiment, the receiving device decodes the full bandwidth of information in the received signal (including control channels and payload channels) in the second decoding mode.

After processing the information, the receiving device returns to step 802 to monitor the control sub-channels for other control messages. In one embodiment, the receiving device returns to the low-power decoding mode to monitor the control channels at step 802. This may be accomplished, for example, upon the receiving device receiving a control message while in the second decoding mode, instructing it to return to the low-power decoding mode. Alternatively, the receiving device may return to the low-power automatically if it does not receive payload information for a predetermined time period, or if it determines that a payload message is complete based, for example, on a length of message parameter.

The present invention thereby provides a way of reducing the power consumption of a wideband multi-carrier receiving device. The present invention allows the receiving device to participate in voice calls, video calls, web browsing, video-conferencing and/or internet communications without significant access delays.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising a receiving device performing the steps of:
   receiving a multi-carrier signal comprising a plurality of time slots wherein each time slot comprises a plurality of sub-channels;
   operating in a first decoding mode, wherein the first decoding mode comprises a low power mode, to decode one or more sub-channels of the plurality of sub-channels, thereby yielding control information; and
   if the control information includes indicia of payload directed to the receiving device, operating in a second decoding mode to decode one or more additional sub-channels of the plurality of sub-channels thereby yielding payload information.

2. The method of claim 1, wherein in the first decoding mode, the receiving device decodes the one or more sub-channels of the plurality of sub-channels, thereby further yielding payload information.

3. The method of claim 1, wherein in the first decoding mode, the receiving device decodes only the one or more sub-channels of the plurality of sub-channels which yield control information.

4. The method of claim 3, wherein in the second decoding mode, the receiving device decodes the one or more sub-channels of the plurality of sub-channels which yields control information and the one or more additional sub-channels of the plurality of sub-channels which yield payload information.

5. The of claim 1, further comprising:
   receiving a multi-carrier signal comprising a plurality of time slots wherein each time slot comprises M sub-channels spanning a bandwidth $B_M$; and
   recieving control information in one or more control sub-channels of the M sub-channels occupying a first portion of the bandwidth $B_M$.

6. The method of claim 5, wherein the receiving device is a radio communication unit.

7. The method of claim 5, further comprising:
   decoding, by the receiving device, the control sub-channels to receive the control information.

8. The method of claim 7, wherein the step of decoding the control sub-channels comprises the receiving device decoding only the control sub-channels.

9. The method of claim 5, further comprising, upon a sending device having payload information directed to the receiving device:
sending, by the sending device, the payload information to the receiving device in one or more payload sub-channels of the M sub-channels occupying a second portion of the bandwidth $B_M$.

10. The method of claim 9, further comprising:
decoding, by the receiving device, the payload sub-channels to receive the payload information.

11. The method of claim 10, wherein the step of decoding the payload sub-channels comprises the receiving device decoding the full bandwidth $B_M$.

12. The method of claim 9 wherein, prior to sending the payload information, the sending device performs the step of:
sending, via the control sub-channels, a message informing the receiving device to decode at least the one or more payload sub-channels to receive the payload information.

13. The method of claim 5, further comprising, upon a sending device having payload information directed to the receiving device:
determining, by the sending device, if the payload information can be communicated via the control sub-channels; and
if the payload information can be communicated via the control sub-channels, sending the payload information to the receiving device via the one or more control sub-channels.

14. The method of claim 13, further comprising:
decoding, by the receiving device, the control sub-channels to receive the payload information.

15. The method of claim 14, wherein the step of decoding the control sub-channels comprises the receiving device decoding only the control sub-channels.

16. The method of claim 13, comprising, if the payload information can not be communicated via the control sub-channels,
sending, by the sending device, the payload information to the receiving device in one or more payload sub-channels of the M sub-channels occupying a second portion of the bandwidth $B_M$.

17. The method of claim 16, further comprising:
decoding, by the receiving device, the payload sub-channels to receive the payload information.

18. The method of claim 17, wherein the step of decoding the payload sub-channels comprises the receiving device decoding the full bandwidth $B_M$.

19. The method of claim 16 wherein, prior to sending the payload information, the sending device performs the steps of:
sending, via the control sub-channels, a message informing the receiving device to decode the one or more payload sub-channels to receive the payload information.

20. A communication device comprising:
an antenna for receiving a multi-carrier signal comprising a plurality of time slots wherein each time slot comprises M sub-channels; and
a decoding element for independently decoding each of the M sub-channels, the decoding element being operable in a first decoding mode, wherein the first decoding mode comprises a low power mode, to decode one or more control sub-channels of the M sub-channels and in a second decoding mode to decode one or more payload sub-channels of the M sub-channels.

21. The communication device of claim 20, wherein in the first decoding mode, the decoding element decodes only the control sub-channels.

22. The communication device of claim 20, wherein in the second decoding mode, the decoding element decodes the control sub-channels and the payload sub-channels.

* * * * *